United States Patent
Bilotta

(10) Patent No.: US 9,740,772 B2
(45) Date of Patent: *Aug. 22, 2017

(54) METHOD AND SYSTEM FOR MAINTAINING INTEGRITY OF A USER'S LIFE STATE INFORMATION

(71) Applicant: Michael Bilotta, Portola Hills, CA (US)

(72) Inventor: Michael Bilotta, Portola Hills, CA (US)

(*) Notice: Subject to any disclaimer, the term of this patent is extended or adjusted under 35 U.S.C. 154(b) by 2 days.

This patent is subject to a terminal disclaimer.

(21) Appl. No.: 13/913,095

(22) Filed: Jun. 7, 2013

(65) Prior Publication Data

US 2013/0275445 A1    Oct. 17, 2013

Related U.S. Application Data

(63) Continuation of application No. 13/101,058, filed on May 4, 2011, now Pat. No. 8,484,098.

(Continued)

(51) Int. Cl.
*G06Q 30/00* (2012.01)
*G06F 17/30* (2006.01)
(Continued)

(52) U.S. Cl.
CPC .... *G06F 17/30699* (2013.01); *G06F 17/3089* (2013.01); *G06Q 30/02* (2013.01);
(Continued)

(58) Field of Classification Search
CPC ....... G06Q 30/0251; G06Q 30/0253–30/0258; G06Q 30/0601; G06Q 30/0613–30/0619;
(Continued)

(56) References Cited

U.S. PATENT DOCUMENTS 5,848,396 A    12/1998  Gerace
6,029,195 A    2/2000  Herz
(Continued)

OTHER PUBLICATIONS

EBay Launches the Most Comprehensive Trust and Safety Upgrades to the World's Largest Person-To-Person Trading Site, PR Newswire (New York) Jan. 15, 1999:1.

*Primary Examiner* — William Allen
(74) *Attorney, Agent, or Firm* — Rutan & Tucker LLP; Hani Z. Sayed

(57) ABSTRACT

A method for enabling a user to view information filtered to align with the user's life state includes enabling the user to register and become a member of an information delivery system. The user provides the information about the user's life state. This information may include at least demographic information, ethnic information, social information and psychological information. The user may grant partners permission to access the information about the user's life. The granting of the permissions is performed and controlled by the user and may be limited to some information about the user's life. The partners are also members of the information delivery system. The partners are evaluated using a set of criteria before they become members of the information delivery system. The partners may use the information about the user's life to filter its information according to the information about the user's life. The method also enables the partner to participate in a marketplace to procure the information about the user's life, to rate the user according to the user's behavior, and to enable search engines to filter search results according to the information about the user's life.

2 Claims, 15 Drawing Sheets

Related U.S. Application Data

(60) Provisional application No. 61/448,817, filed on Mar. 3, 2011.

(51) Int. Cl.
*G06Q 30/06* (2012.01)
*G06Q 30/02* (2012.01)

(52) U.S. Cl.
CPC ..... *G06Q 30/0251* (2013.01); *G06Q 30/0254* (2013.01); *G06Q 30/0619* (2013.01); *G06Q 30/0631* (2013.01)

(58) Field of Classification Search
CPC ............ G06Q 30/0631; G06Q 30/0641; G06F 17/30002; G06F 17/30241; G06F 17/30283; G06F 17/30861; G06F 17/30867
USPC ............ 705/14.4–14.73, 26.1–27.2; 707/705–712, 736–737, 754
See application file for complete search history.

(56) References Cited

U.S. PATENT DOCUMENTS

| | | |
|---|---|---|
| 6,138,142 A | 10/2000 | Linsk |
| 6,182,068 B1 | 1/2001 | Cullis |
| 6,343,274 B1 | 1/2002 | McCollom et al. |
| 6,480,835 B1 | 11/2002 | Light |
| 6,539,377 B1 | 3/2003 | Culliss |
| 7,069,308 B2 | 6/2006 | Abrams |
| 7,139,157 B2 | 11/2006 | Taylor |
| 7,328,216 B2 | 2/2008 | Hofmann et al. |
| 7,620,628 B2 | 11/2009 | Kapur et al. |
| 7,693,827 B2 | 4/2010 | Zamir et al. |
| 7,716,223 B2 | 5/2010 | Haveliwala et al. |
| 7,739,408 B2 | 6/2010 | Fish et al. |
| 7,761,464 B2 | 7/2010 | Radlinski et al. |
| 7,783,636 B2 | 8/2010 | Church et al. |
| 7,827,170 B1 | 11/2010 | Horling et al. |
| 7,882,039 B2 | 2/2011 | Weiss et al. |
| 8,484,098 B2 * | 7/2013 | Bilotta ........................ 705/26.7 |
| 2008/0010128 A1 | 1/2008 | Allen |
| 2008/0281622 A1 | 11/2008 | Hoal |
| 2009/0204599 A1 | 8/2009 | Morris et al. |
| 2011/0145057 A1 | 6/2011 | Jones et al. |
| 2011/0208589 A1 | 8/2011 | Garg |

* cited by examiner

METHOD AND SYSTEM FOR MAINTAINING INTEGRITY OF A USER'S LIFE STATE INFORMATION

RELATED APPLICATION

This application claims to U.S. patent application Ser. No. 13/101,058 entitled "Information Delivery System" and filed on May 4, 2011 and priority to U.S. Provisional Application entitled "VARIOUS SYSTEMS AND METHODS FOR INFORMATION MANAGEMENT" filed on Mar. 3, 2011 having U.S. Provisional Patent Application No. 61/448,817.

FIELD

Embodiments of the present invention generally relate to the field of data processing, and in some embodiments, specifically relate to an information delivery system.

BACKGROUND

Users today rely heavily on the Internet to search for information. Popular search engines such as Microsoft's Bing™ search engine and Google®'s search engine compete against one another to deliver more accurate searches to the users. Search services may be available to the users as part of a web portal (e.g., Microsoft MSN®, Yahoo®) or simply as a search interface (e.g., Google®). Generally, the search engine may rely on web crawlers or spiders to crawl websites for keywords or information that it deems relevant. The information extracted by the web crawlers may be added into an index database so that it can be queried and quickly found. Accurate searches are important to the users and correspondingly the advertisers and/or content providers. The accuracy of the searches may be based on the keywords selected by the users and how effective the search engines are in building and querying the index database. The current methods also use inferential technologies to enhance the results but still lack accuracies. When a search is perceived by a user as accurate, the user is more likely to continue using the same search engine for subsequent searches. This search method may be acceptable to the users for impulse or immediate needs. However, this method is becoming archaic and flawed, and it is especially flawed for obtaining information on an ongoing basis.

SUMMARY

For some embodiments, a method to enable a user to receive information that is filtered to align with the information about the user's life is disclosed. The information about the user's life may be referred to as the user's life state. The user's life state may encompass many aspects related to the user including at least demographic, ethnic, social and psychological aspects. The user may provide or load the user's life state. The user may grant approved third parties access to the user's life state including associated attributes and sub-attributes. The third parties are approved based at least on their ability to filter its information that is consistent with the user's life state, at volume and frequency levels specified by the user. The user may selectively block a third party from having access to portions or all of the user's life state. The user may be able to rate a third party based on whether the information provided by the third party is aligned with the user's life state. The third party may be able to rate the user based on whether the user's behavior is aligned with the user's life state. The filtered information is pulled from the third parties and presented to the user via the user's portal. In some embodiments, the filtered information may be presented to various devices, appliances, and systems. A marketplace may be implemented to enable the third parties to procure the life states from many users according to settings controlled by the users.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

DETAILED DESCRIPTION

Figure 1:
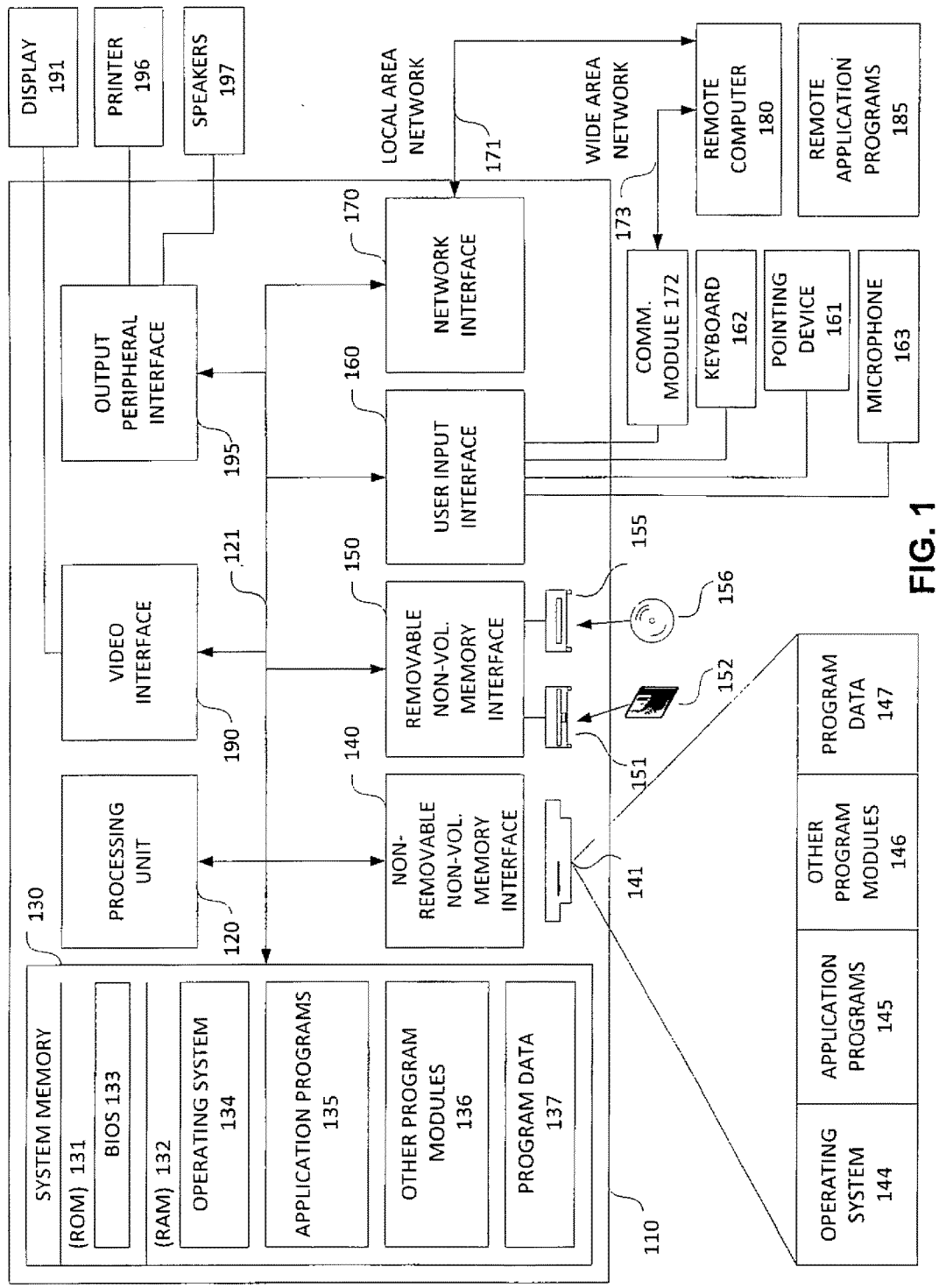
FIG. 1 illustrates one example of a computing device that may be used, in accordance with some embodiments.

For some embodiments, a method for information delivery is disclosed. The method comprises enabling a user to register and become a member of an information delivery ecosystem. The user provides or loads information about the user's life which is also known as a life state. The user's life state may span all areas of a user's life and include at least demographic information, ethnic information, social information, behavioral information, and psychological information. The user may grant third parties permission to access the user's life state. The third parties are also members of the information delivery system. The third parties are evaluated using a set of criteria before they become the members of the information delivery system. The third parties may use the user's life state to filter information for the user.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in block diagrams in order to avoid unnecessarily obscuring the present invention. Thus, the specific details set forth are merely exemplary. The specific details may be varied from and still be contemplated to be within the spirit and scope of the present invention.

The present invention also relates to an apparatus for performing the operations herein. This apparatus may be specifically constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Computer System

FIG. 1 illustrates a block diagram of an example computing system that may use an embodiment of one or more of the software applications discussed herein, in accordance with some example embodiments. The computing system environment 100 is only one example of a suitable computing environment, such as a client device, and is not intended to suggest any limitation as to the scope of use or functionality of the design. Neither should the computing environment 100 be interpreted as having any dependency or requirement relating to any one or combination of components illustrated in the exemplary operating environment 100. Embodiments of the invention may be implemented on any type of computer, device, apparatus, or even machine that make use of the computer environment 100. For example, the device may be a medical device that accesses the user's medical history or current conditions.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, automotive and informational appliances, and the like.

The design may be described in the general context of computing device executable instructions, such as program modules, being executed by a computer. Generally, the program modules include routines, programs, objects, components, data structures, etc., that perform particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing type system for implementing the design includes a general-purpose computing device in the form of a computing device 110. Components of computing device 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 110 typically includes a variety of computing machine readable media. Computing machine readable media can be any available media that can be accessed by computing device 110 and includes both volatile and nonvolatile media, removable and non-removable media. By way of example, and not limitation, computing machine readable mediums includes storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but they may be connected by other interface and bus structures, such as a parallel port, game port or a universal serial bus (USB). A monitor or display 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing device 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing device 110. The logical connections depicted in FIG. 1 include a local area network (LAN) 171 and a wide area network (WAN) 173, but may also include other networks. Such networking environments are commonplace in offices, enterprise-wide computer networks, intranets, extranets, and the Internet. In some embodiments, such networking environments may also include satellite, radio frequency (RF), Bluetooth and other means of pushing and/or pulling information. A browser application may be resident on the computing device and stored in the memory.

When used in a LAN networking environment, the computing device 110 is connected to the LAN 171 through a network interface or adapter 170. When used in a WAN networking environment, the computing device 110 typically includes a communication module 172 or other means for establishing communications over the WAN 173, such as the Internet. The communication module 172 may be a modem used for wired, wireless communication or both. The communication module 172 may be internal or external, may be connected to the system bus 121 via the user-input interface 160, or other appropriate mechanism. In a networked environment, program modules depicted relative to the computing device 110, or portions thereof, may be stored in the remote memory storage device. By way of example, and not limitation, FIG. 1 illustrates remote application programs 185 as residing on a remote computer 180. It will be appreciated that the network connections shown are exemplary and other means of establishing a communications link between the computers may be used.

It should be noted that the present design can be carried out on a computing system such as that described with respect to FIG. 1. However, the present design can be carried out on a server, a computer devoted to message handling, or on a distributed system in which different portions of the present design are carried out on different parts of the distributed computing system.

Another device that may be coupled to bus 111 is a power supply such as a battery and Alternating Current adapter circuit. As discussed above, the DC power supply may be a battery, a fuel cell, or similar DC power source that needs to be recharged on a periodic basis. For wireless communication, the communication module 172 may employ a Wireless Application Protocol to establish a wireless communication channel. The communication module 172 may implement a wireless networking standard such as Institute of Electrical and Electronics Engineers (IEEE) 802.11 standard, IEEE std. 802.11-1999, published by IEEE in 1999. Other wireless communication methods that may also be used may include Bluetooth, Radio Frequency, etc.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with an on board processing power and wireless communications ability that is powered by a Direct Current (DC) power source that supplies DC voltage to the mobile device and that is solely within the mobile computing device and needs to be recharged on a periodic basis, such as a fuel cell or a battery.

It is possible for some embodiments of the invention to have a computing environment 100 that entails memory and display functions without a processing function. For example, a third party may provide customized information to a user, which is relayed to a device for display only with no data manipulation necessary. It should be noted that, in some embodiments, other types of system designs or configurations that are used in the delivery of information may also be used.

Network Environment

Figure 2:
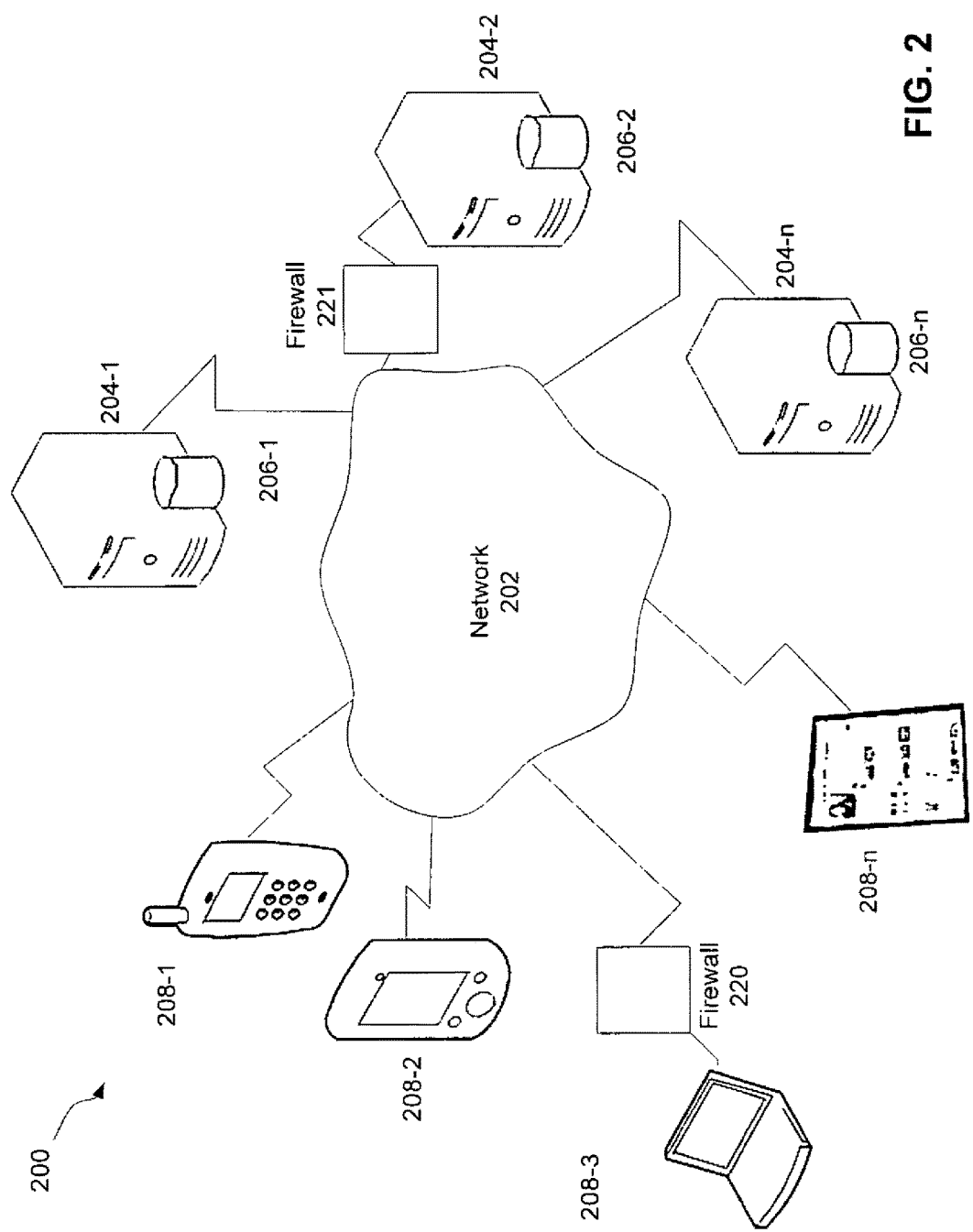
FIG. 2 illustrates an example of a network that may be used to pull filtered information, in accordance with some embodiments.

FIG. 2 illustrates a network environment 200 in which the techniques described may be applied, in accordance with some example embodiments. The network environment 200 has a network 202 that connects server computing systems 204-1 through 204-n, and at least one or more client computing systems 208-1. As shown, there may be many server computing systems 204-1 through 204-n and many client computing systems 208-1 through 208-n connected to each other via a network 202, which may be, for example, the Internet. Note, that alternatively the network 202 might be or include one or more of; an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who initiates communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 208-1 and the server computing system 204-1 can both initiate and respond to communications, their communication may be viewed as peer-to-peer. Likewise, communications between the client computing systems 204-1, 204-2 and the server computing systems 208-1, 208-2 may be viewed as peer-to-peer if each such communicating device is capable of initiation and response to communication. One or more of the server computing systems 204-1 to 204-n may be associated with a database such as, for example, the databases 206-1 to 206-n. A firewall such as, for example, the firewall 220 between a client computing system 208-3 and the network 202, may be used to protect data integrity. Another firewall example is the firewall 221 positioned between the server 204-2 and the network 202. Although not shown, other devices (e.g., proxy servers, etc.) may also be connected to the network 202.

FIG. 2 also illustrates a block diagram of an embodiment of a server computing system to display information, such as a web page, etc. A user via a browser from the client computing system 208-1 may interact with the web page, and then supply input to the query/fields and/or service presented by a user interface of the application. The web page may be served by a web server computing system 204-1 on any Hypertext Markup Language (HTML) or Wireless Access Protocol (WAP) enabled client computing system 208-1 or any equivalent thereof. For example, the client mobile computing system 208-1 may be a smart phone, a touch pad, a laptop, a netbook, etc. The client computing system 208-1 may host a browser to interact with the server computing system 204-1. Each application, widget, plug-in, etc. has a code scripted to perform the functions that the software component is coded to carry out such as presenting fields and icons to take details of desired information. The applications may be hosted on the server computing system 204-1 and served to the browser of the client computing system 208-1. The applications then serve pages that allow entry of details and further pages that allow entry of more details.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM) random access memory (RAM) magnetic disk storage media; optical storage media; flash memory devices DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, SQL, Java, or other variants of such or similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be noted that the configuration of the diagram illustrated in FIG. 2 is for illustrative purposes only, and the actual configurations may vary. There might be different configurations of servers, firewalls, clients, and devices. For example, the devices may be anything from iPads, to Autos, to TV devices, and so on.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Overview

As the Internet continues to evolve into a more intelligent network of information, there remains a significant gap between what the users want and what or how the search engines can deliver the information to the users. Current search techniques have many limitations that embodiments of the present invention address. Following are some of the factors regarding the limitations of the current search techniques: (a) Users may not accurately understand when they should submit a query or that their situation requires a query; (b) It is almost impossible to use accurate search terms or keywords in a way that will yield exactly what the users are looking for; (c) Even if the accurate search terms are provided, changes in the user's Life State or the information environment may cause what is considered accurate during one time period to become inaccurate during another time period; (d) Because of a user's privacy rights, the searches performed by the search engines will always be inadequate by failing to accurately take into consideration factors hidden or limited by the privacy rights; (e) Because of privacy rights, the searches performed by the search engines will be invasive to a User's privacy rights, as the current method of managing privacy rights is flawed; (f) There are no user feedback mechanisms to bilaterally advise the providers of search results of their accuracy, allowing the providers to more effectively tailor their results for each User; (g) Since the number of organizations and indexed information is theoretically infinite, there is no mechanism that causes the providers of search results use a method of continuous improvement and focus to yield fewer more relevant query results. Instead, there is the appearance of some relevant results within an extremely large data set, composed mostly of less relevant results.

Embodiments of the invention fully exploit the information about a user's life to enable delivering filtered and customized information to the users. The information about the user's life is also referred to as a life state. The life state may consist of many categories. A user may grant third parties access to the user's life state by setting security features and gatekeeping features. As will be described, embodiments of the present invention may include an information delivery system that delivers filtered information to the users. The information delivery system enables third parties to have access to the users' life states, as allowed in transactions between the users and the third parties. Each user is associated with a unique life state. The life state is used as filters or as a basis for customized services (e.g., web sites, emails, etc.). Embodiments of the invention also include an architecture that includes a centralized server computer system connected to the Internet and configured to deliver information to the users. The centralized server computer system is referred to herein as an information delivery server. The information delivery server may be configured to provide the users life state interface to enable the users to provide the values for the attributes and sub-attributes associated with their life states. The information delivery server is coupled with a database configured to store the values for the attributes and the sub-attributes. The information delivery server is configured to provide the users a portal interface to configure their own portals. The users may use their portals to view the filtered information. The information delivery server may also be configured to enable the users and the third parties to rate one another. Replication may be involved to make access, delivery and update operations by the information delivery server more efficient.

The information delivery server may be associated with a marketplace portal to enable the users and the third parties to enter into transactions. The transactions may include the users getting compensated for allowing the third parties to access the users' life state, the third parties bidding against one another to earn the right to access the users' life states, etc. In addition, the information delivery server may be configured to enable the user's life state to be used when the user visits a website of a third party. This enables the third party to provide web pages that are customized according to the user's life state.

Life State

Figure 3A:
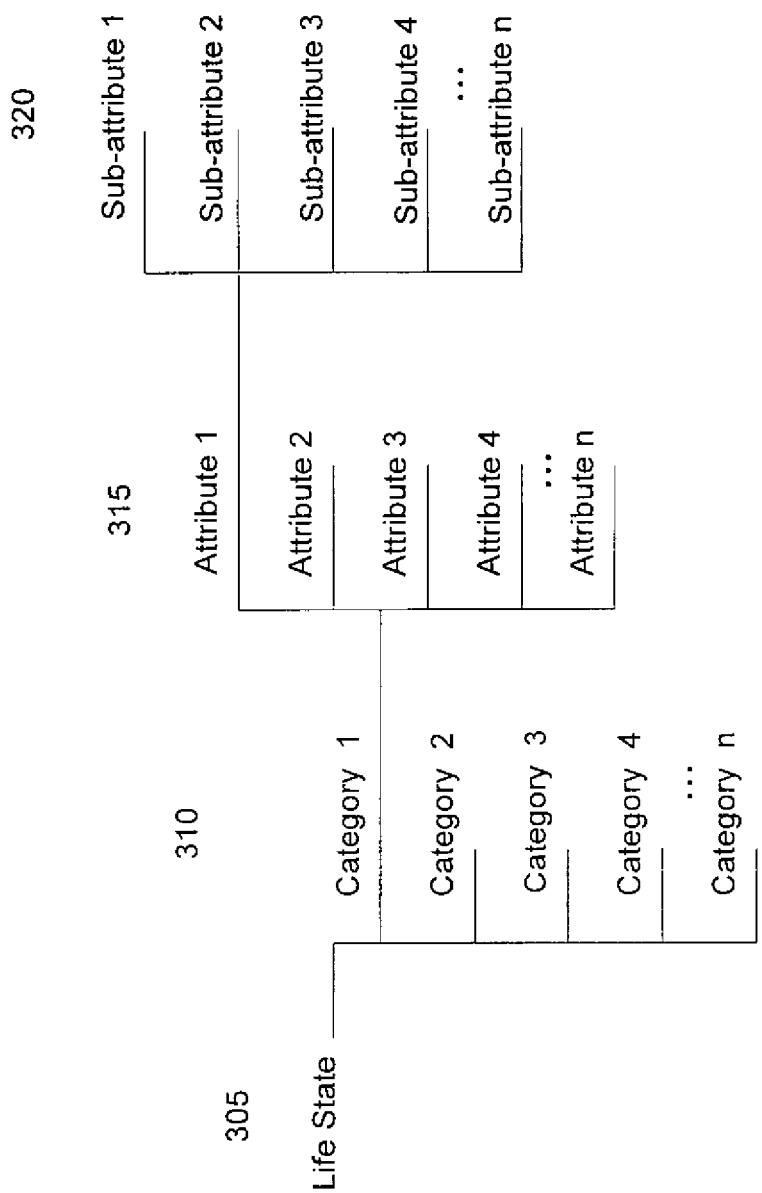
FIG. 3A illustrates an example structure of a life state, in accordance with some embodiments.

FIG. 3A illustrates an example structure of a life state, in accordance with some embodiments. A life state may be associated with many categories. Each category may consist of many attributes. Each attribute may consist of many sub-attributes. Together, the categories, the attributes, and the sub-attributes may conceptually describe who the user is from many different views. The categories, attributes and sub-attributes may be related to one another in a top-down relationship and/or laterally—enhancing the interpretations of each attribute value. The categories, the attributes, and the sub-attributes may be defined by an administrator or a management team of the information delivery system. In some embodiments, they may also be defined by industry authorities. Each of the attributes and sub-attributes is associated with a value. Embodiments of the present invention enable the users to maintain and control the values of each of the attributes and sub-attributes. The values may be in any format including, for example, data, text, qualitative, Boolean yes/no, numeric, etc.

Referring to FIG. 3A, the life state 305 may consist of multiple categories 310. It is envisaged that each of the many aspects of a user's life can be mapped to a category of the life state 305. Each of the categories 310 may consist of many attributes 315 and sub-attributes 320. Although not illustrated, each of the sub-attributes 320 may consist of many deeper levels of sub-attributes. For example, under the sub-attribute 1, there may be sub-attribute 1.1, sub-attribute 1.2, etc. The categories, attributes, and/or sub-attributes may be dynamic and may be managed by an administrator. For example, new categories, attributes, and/or sub-attributes may be added or removed; an attribute under one category may be moved to another category, etc. The ability to update the categories, the attributes and the sub-attributes illustrate the dynamic nature of the life state.

Following are some possible categories, attributes, and sub-attributes. There may be a category "psychological." Under this category, there may be attributes "personality type", "planner/spontaneous", and "conservative/risk taking." Under the attribute "personality type", there may be the sub-attribute "Myers Briggs Classification" and the sub-attribute "Functions of Consciousness", and the sub-attribute "Extraversion/Introversion." Under the category "personal core information", there may be several attributes such as "age", "sex", "marital status", "family", "physical", "health", "ethnicity", etc. Under the attribute "health", there may be a sub-attribute such as "ailments", and under the sub-attribute "ailments", there may be lower level of sub-attributes such as "treatments", "medication", etc. A value for the sub-attribute "ailments" may be "diabetes." A value for the attribute "marital status" may be "single." As mentioned, the number of categories, attributes and sub-attributes may be large since they together describe the users' life state. Other example categories are described in the corresponding provisional application which is described in the related application section at the top of this document.

As the user's life changes, the values for the attributes and/or sub-attributes may be updated. For example, the value for the attribute "marital status" may be changed from "single" to "married." For some embodiments, the values for the attributes and sub-attributes may be automatically provided. Other possible categories, attributes, and/or sub-attributes may include but not limited to: 'life style", "political", "social", "technology skills", "entertainment", "career", "goals", "education." The number combinations of categories, attributes, and sub-attributes (and deeper levels of sub-attributes) may be extensive, and may represent a snap shot of the life of a user. It may be noted that this is different from the traditional user profile used by current systems since the information included in a traditional user profile is very limited and not as extensive as what is included in a user's life state. An option may be provided to enable the users to select using the automatic setting of values. For example, a new user may select this option to speed up the processing of setting up the user's life state. The user may then update the values as necessary. The information delivery server may be configured to provide interview tools, wizards, or applications that gather and map the information about the user to the relevant attributes and sub-attributes.

Figure 3B:
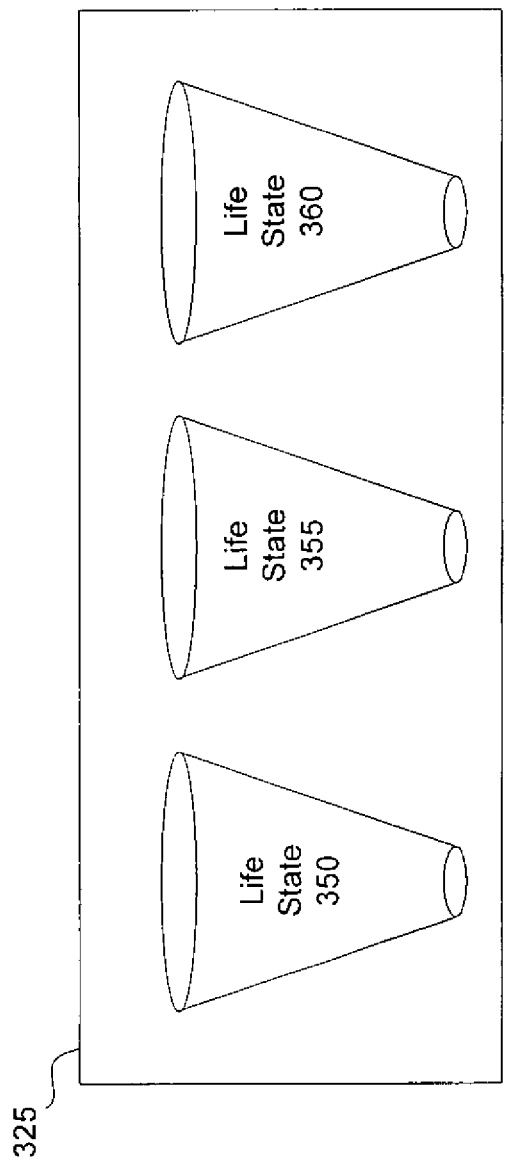
FIG. 3B illustrates an example of a collection life states, in accordance with some embodiments.

FIG. 3B illustrates an example of a collection of life states, in accordance with some embodiments. The collection of life states 325 may represent the life states of many users. In the current example, the collection of life states 325 includes the life states 350, 355 and 360. The funnel shape associated with each of the life states 350, 355 and 360 illustrates the concept of using a life state to funnel or filter the information available from the third parties. Typically, most of the information from the third parties is not relevant or applicable to the user. The life state helps funneling the information available from the third parties so that only filtered information is pushed by the third parties. In other words, the life state enables the third parties to push the right type of information to the user.

The life state may also be used in other applications. In the case of the user surfing the web and visiting a web site, the life state enables the web site to display customized web pages that may include information matching to what the user is interested in. In the case of a marketplace, the filtered information allowed for procurement of the life states by the third parties in bulk—according to the users' privacy, security, and gatekeeping attributes. In the case of search using a search engines, the life state enhance the search results generated by the search engine.

Figure 3C:
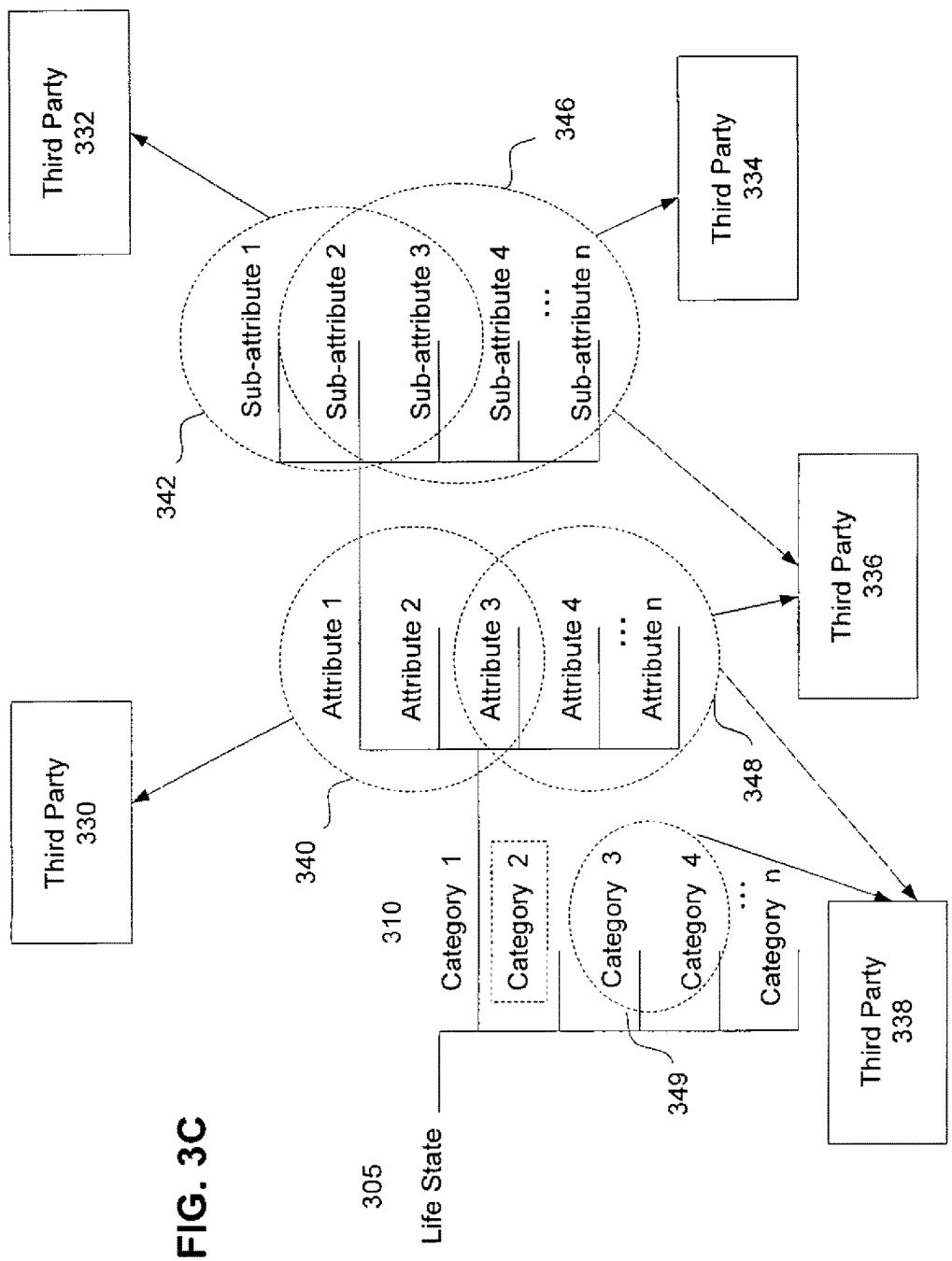
FIG. 3C illustrates an example of granting access to the life state, in accordance with some embodiments.

FIG. 3C illustrates an example of granting access to the life state, in accordance with some embodiments. This example illustrates a life state structure similar to the example described with FIG. 3A. A user has complete control how the access to the user's life state is granted. The granting of the access can be at the category level, the attribute level, the sub-attribute level, or combinations thereof. A combination of one or more categories, one or more attributes, and/or one or more sub-attributes is referred to as an access group. Each access group may be viewed as a subset of the life state. A third party can be granted permission to access one or more access groups. It should be noted that the granting of the access isn't just about seeing the information associated with the user's life state, it's also about how the third party uses the information according to the security and gate keeping attributes. The content of an access group may vary and may be changed by the user. As will be described, the granting of the access is performed using the security and gatekeeping features.

As illustrated, the third party 330 is granted access to the access group 340 which consists of values associated with some attributes under the category 1. The third party 332 is granted permission to the access group 342 which consists of values associated with some sub-attributes under the attribute 1. The third party 334 is granted permission to the access group 346 which consists of values associated with some sub-attributes under the attribute 1. The third party 336 is granted permission to the access group 348 which consists of values associated with some attributes under the category 1. The third party 336 is also granted permission to the access group 346. The third party 338 is granted permission to the access group 348 which consists of values associated with some attributes under the category 1. The third party 338 is also granted permission to the access group 349 which consists of values associated with the attributes and sub-attributes under the category 3 and category 4. These access group and granting permission examples illustrate some of the flexibilities and control that a user may have with the user's life state. The directions of the arrows from the access groups to the third parties illustrate the granting of the permission by the user to the third parties.

Figure 3D:
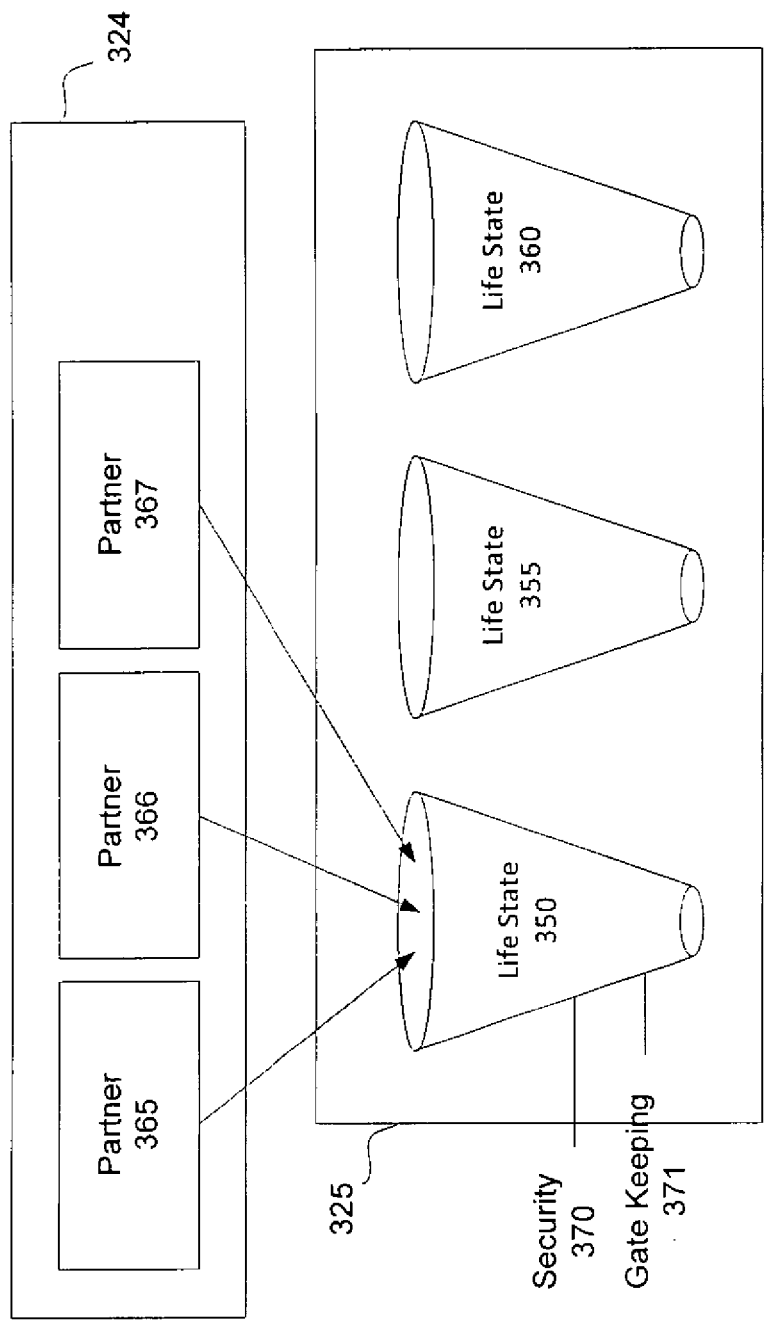
FIG. 3D illustrates an example diagram of a group of partners, in accordance with some embodiments.

FIG. 3D illustrates an example diagram of a group of partners, in accordance with some embodiments. The diagram includes life states similar to the life states described with FIG. 3B. For some embodiments, a third party may have to be approved before it can be granted permission to one or more access groups. A set of criteria may be used to evaluate and approve a third party. The set of criteria may be determined by a management team or an administrator associated with the information delivery system. For example, the criteria may include one or more of the following: the ability of the third party to provide information to the users according to their life states, the type of service, merchandise and/or information that the third party is offering and whether they map to the categories, attributes and sub-attributes defined by the life state structure, the ability of the third party to map its services and information to the life state structure, the reputation of the third party, the likelihood that the third party will continue to perform as a partner and a leader in the category/attribute/sub-attribute that it is assigned to, etc. Other criteria may also be used.

Once a third party is approved, it becomes a partner. A license may be granted to the third party. The license may give the third party permission to copy the users' life states for a defined period. There may be an expiration date, and the license may need to be renewed. The third parties use the copies of the life states to filter its information, or the third parties may customize its web site for the users when the users visit the websites of the third parties. The customization of the web site and its web pages may be according to the life states as granted to the third parties by the users. Depending on the actions of a third party, a license may be active, suspended, or revoked. Other license status may also be used. Security credentials including user identification (ID) and password may be assigned to an approved third party. A third party who has been approved is referred to herein as a partner. For some embodiments, only those partners whose status is active may be granted permission to access the users' life states. There may be different types of partners. For example, a partner may be an individual, an organization, a governmental agency, etc. The partners may also be defined based on the type of services they offer. For example, the type "Search Engines" may be used for Microsoft and Google when they become partners, and the partner type "Government" may be used when the Medicare office may want to access the users' life states for benefits administration.

In the current example, the block 324 represents all of the partners. They include the partners 360, 361 and 362. These partners have been granted permission to the life state 350. As described with FIG. 3C, the level of permission of each of the partners 360, 361 and 362 may be different. The directions of the arrows from the partners 360, 361 and 362 to the life state 350 illustrate the filtering of the information from the partners. For some embodiments, the partners may push information to the users, and they may also offer auto-load program that automatically populates user attributes in the life state. For example, Amazon.com may push information to a user (such as new technology product releases), and Amazon.com may also offer an auto-load program that populates attributes relating to technology adoption, asset inventory, etc.

Figure 3E:
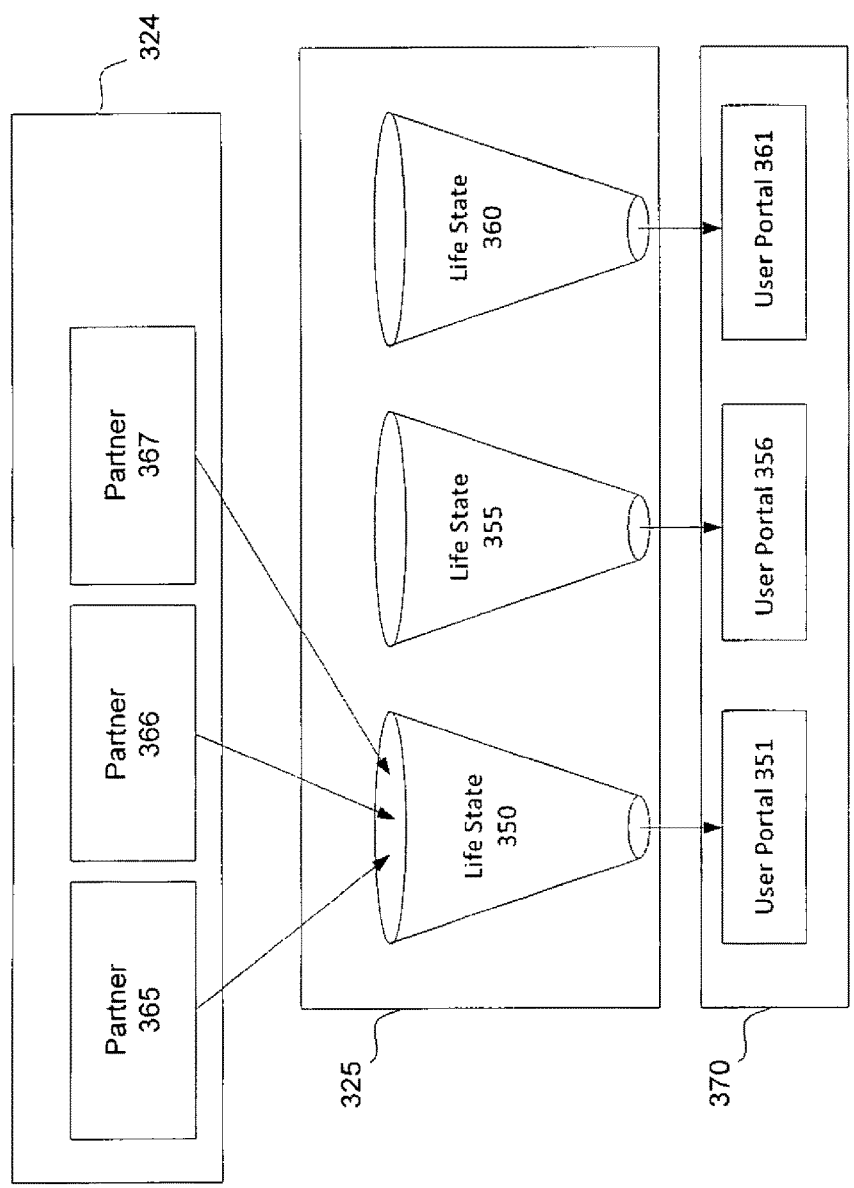
FIG. 3E illustrates an example diagram of a portal, in accordance with some embodiments.

FIG. 3E illustrates an example diagram of a portal, in accordance with some embodiments. The information delivery server may be configured to receive the filtered information from the partners 324 on behalf of the users and present that information to the user via their portals 370. Each user is associated with a portal. In the current example, the portal 351 is associated with the life state 350, the portal 356 is associated with the life state 355, and the portal 361 is associated with the life state 360. To access the filtered information, the users may need to log in to the information delivery server using their user IDs and passwords. The filtered information may also be stored as floating variable, cache, memory, etc. on any device or system that accesses the filtered information. The directions of the arrows from the life states 350, 355 and 360 to the respective portals 351, 356 and 361 illustrate the flow of the filtered information to the portals. The information available via the portal 351 may be different from the information available via the portal 356 because the life state 350 may be different from the life state 355. FIG. 3E also illustrates the overall concepts of embodiments of the present invention where the collection of life states 325 is used to filter the information from the partners 324 to create the filtered information (or a subset of the information of the partner), where the filtered information is presented to the users via the portals 370. For some embodiments, the pulling of the filtered information from the partners is automatic.

Server Applications

Figure 4:
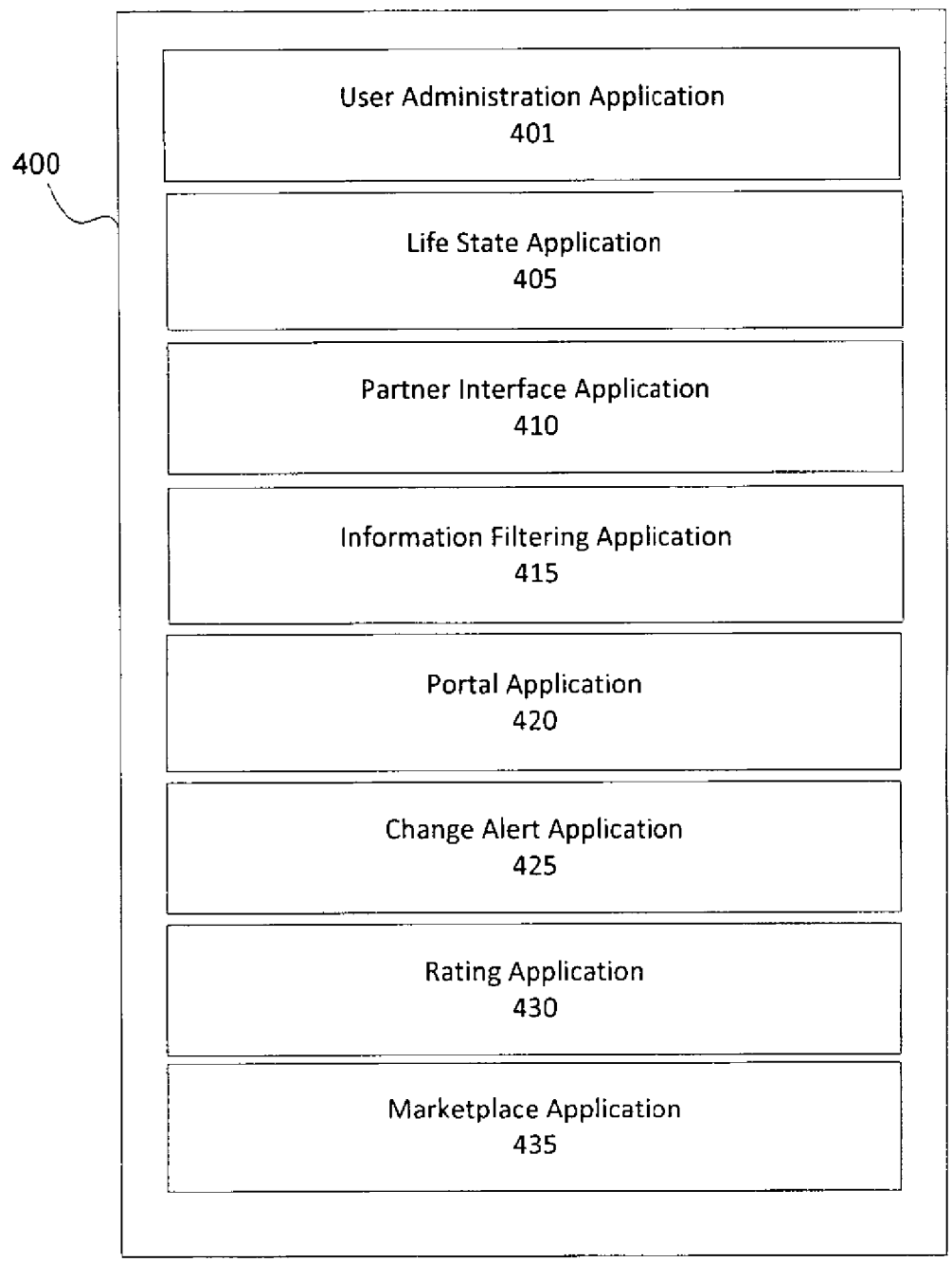
FIG. 4 illustrates example applications that may be used to enable the users to receive the filtered information from the partners, in accordance with some embodiments.

FIG. 4 illustrates example applications that may be used to enable the users to receive the filtered information from the partners, in accordance with some embodiments. The information delivery server 400 may include user administration application 401, life state application 405, partner interface application 410, information filtering application 415, portal application 420, change alert application 425, rating application 430 and marketplace application 435. It may be noted that even though these applications are described herein as separate applications, the functionalities of two or more of them may be combined into one application. These applications may be used to pull filtered information from various resources. The resources may include Internet websites associated with the partners. Non-Internet resources may also be used. For example, a user's life state may be replicated on devices, appliances, or any means that allows the user to control how to grant permission to the user's life state, the third parties to access the user's life state, and the pushing of the filtered information by the third parties on behalf of the user. It may be noted that not every device or appliance used in embodiments of the invention is a filtered information pushing mechanism. That is, some devices may be registered in the core system to receive the pushed information, and then the devices may only function in the ecosystem as a conduit for the pushing of the filtered information to the users.

The user administration application 401 may be configured to manage the users and the partners including setting up their user accounts, user IDs, passwords, etc. These user accounts allow the users and the partners to participate in the information delivery system associated with the information delivery server 400. The user accounts may be stored in the database associated with the information delivery server 400. The user accounts of the users may be encrypted and stored locally in the client computing systems. The client computing systems may be appliances, devices, etc. This enables a partner to recognize the user as a member of the information delivery system when the user visits a website associated with the partner. This may enable the partner to keep track of the user's behavior while visiting that website to determine if the user's behavior is aligned with the user's life state. The user administration application 401 may also keep track of user type (e.g., user, administrator, etc.), partner type (e.g., individual, organization, etc.), partner category (e.g., content provider, advertiser, etc.), partner status (e.g., active, revoked, suspended, pending, etc.), and the type of license granted to the partner, etc. It may be noted that the user may be an individual, an organization, a business, etc.

The life state application 405 may be configured to perform operations associated with forming and maintaining of the life states of many users. The life state application 405 may be configured to enable an administrator to define a life state structure including the categories, attributes, and sub-attributes. The life state application 405 may be configured to present a life state interface to allow the users to provide and update the values for the attributes and sub-attributes for their life states. For some embodiments, the life state application 405 may also be configured to perform consistency verification to determine if the user provides inconsistent values for the attributes and/or sub-attributes and to notify the user if inconsistencies are found. Other consistency verification may include user behavior versus the attributes, and one category/attribute versus another category/attribute.

The life states of all of the users may be securely stored in the database associated with the information delivery server 400 and in a relational structure with tables and fields arranged in ways that are logical and meaningful to the user. When the users update their life states, the updated values may be stored in the same database. It is possible that the updates may also be propagated to other replicated systems, devices, appliances that locally store the values, as well as third parties that customize their web sites according to these values. This propagation would be similar to a change trigger.

For some embodiments, a copy of the user's life state may be downloaded and stored in the memory of the client computing system associated with the user. The copy in the client computing system is referred to as a local copy of the life state. It is possible that, in some embodiments, only a portion of the information or only related information may be stored in the client computing system. This is because getting the exact copy may be too big.

Sometimes it might be just the user id that's stored in floating variables, memory, cache, etc., which then pulls the user's life state when needed.

The local copy may be periodically updated or synchronized with the values stored in the database. The local copy of the life state may enable the user to use it with other services, with the third parties who are not yet partners, etc. For example, the local copy of the life state may be used when the user performs a web search so that the results may be more relevant. For example, when Google becomes a partner, it would benefit from accessing the user's attribute values to deliver relevant search results. It may be noted that the storing of the local copy of the life state in the client computing system is different from the third parties having access to the life state and filtering its information according to the life state. As a variation of the application of the life state, a third party may access a copy of the life state from the information delivery server (instead of from the client computing system) and customized its website according to the user's life state. Similarly, a search engine may access a copy of the life state from the information delivery server and customized its search results accordingly.

Embodiments of the invention may enable the life state to be used in a more global information delivery with every conduit that the user may use for information as opposed to strictly web searches. For example, when the user visits a website, the user may have the option of selecting to apply the user's life state with that website. The option may be a toggle that can be turned on or off, and the information associated with that website may toggle along with this option. If the website maintains user accounts, the user may connect the user id with the information delivery system with the website. This will allow greater flexibility and efficiency when the website accesses the user's life state.

The partner interface application 410 may be configured to enable the information delivery server 400 to communicate with one or more servers of the partners. For example, this may enable the partners to access the users' life states as defined by the users' gate keeping and security features. This may include interfacing with the partners to enable customized websites, filtered search results, etc.

The information filtering application 415 may be configured to share the life states of a user with the partners, limited to the level of permission granted by the user. The information filtering application 415 may also be configured to apply the security and the gate keeping features set by the user. As described, the partners may use the user's life state to filter their information. The information filtering application 415 may receive the filtered information from the partners and present the filtered information to the user via the user's portal. As will be described, the partners may procure the life states via a marketplace.

The portal application 420 may be configured to allow the users to define how the information provided to the users may be presented and viewed. The portal application 420 may be configured to provide a layout interface to allow the user to design the look and feel of the user's portal. The layout interface may include parameters to control the fields, links and dimensions of the layout. The user may define multiple layouts that change according to event rules defined by the user. For example, the user may define parameters that cause the layout to emphasize on financial and economic information when there is a significant swing in the financial market. The layout interface may allow the user to define different information regions. Each of the information regions may focus on the information that corresponds to one aspect of the user's life. As mentioned, each of the users may be associated with a portal. The user accesses the portal by logging into the information delivery system using the assigned user ID and password. The portals, their configurations, layouts, and information regions may be stored in the database associated with the information delivery server 400.

For some embodiments, the portal application 420 may include logic to communicate and present the information to the users via portable devices, appliances, and any other devices that are capable of receiving the filtered information and enabling the user to view the filtered information.

The change alert application 425 may be configured to notify the partners and the users whenever there is a change that may affect the process of proving the filtered information to the users. The changes may originate from the partners and/or users. For example, the change may be necessary to address complaints or suggestions from many users and/or partners. The changes may originate internally by a management team associated with the information delivery system to enhance the information filtering services for the partners and/or the users. For example, it may be necessary to add a new category, to migrate an attribute from one category to another category, to delete an attribute, to change the meaning of an attribute, etc. The changes may originate externally by others. The change alert application 425 may also be configured to notify a partner when the user modifies the user's life state. Similarly, the change alert application 425 may notify a user when the partner's ability to provide its information is modified.

The rating application 430 is configured to improve the quality of the filtered information. This includes providing a mechanism to allow the users to rate the partners as well as a mechanism to allow the partners to rate the users. The rating of the partners is based on whether the filtered information pulled from the partners is aligned with the life states of the users. The rating may be based on a collection of feedbacks from many users. This helps the partners to fine tune their filtering mechanism if they receive low ratings. This also helps identifying the partners who consistently fail to comply with the filtering requirements. For example, a partner who provides unsolicited advertising information should get a low rating because it abuses the information delivery system. A consequence for a partner who gets a low rating is a suspension or revocation of its license. Following are some conceptual examples of the ratings for a partner:

None—The information from the partner is not aligned with the user's life state
    Low—The information from the partner is minimally aligned with the user's life state
    Moderate—The information from the partner is mostly aligned with the user's life state
    High—The information from the partner is significantly aligned with the user's life state In order for a user to receive accurate filtered information, it may be necessary for the user to keep the user's life state updated or utilize automatic loader programs that accomplish the same. This is because the user is rated based on whether the user's life state is aligned with the user's behavior whenever applicable. If a partner determines that the user's life state is not accurate, the partner may notify the user of the alignment issue, through a system of ratings. If the user's behavior remains non-aligned with the user's life state for an extended period of time, the information provided to the user may be limited. Following are some conceptual examples of the ratings for a user:

None—The user's transactions are not aligned with the user's life state
    Low—The user's transactions are minimally aligned with the user's life state Moderate—The user's transactions are mostly aligned with the user's life state High—The user's transactions are significantly aligned with the user's life state The marketplace application 435 may be configured to implement an exchange or a market where the users and the partners participate in sell and buy transactions. In some embodiments, the marketplace may be implemented as a secure web portal that enables the partners to procure the users' life state according to the security and gatekeeping features. For some embodiments, the marketplace application 435 may be implemented as an auction portal with bidding and purchasing options. Other purchasing options (e.g., fixed price, etc.) may also be used. The auction portal may allow searchable bids and reverse bids by the partners and the users. Bid information may be stored in the secured database associated with the information delivery server.

Security and Gatekeeping Features

A partner may access the life states of the user according to the user's security and gatekeeping features. Referring to FIG. 3D, a user may use the security feature 370 and the gatekeeping feature 371 to control how the information is filtered so that the user will receive most relevant and most desirable information. The security feature 370 illustrates an option that a user may use to control the visibility of the user's life state to the partners. The user may use the security feature 370 to control the visibility at the global level, partner level, category level, attribute level or sub-attribute level. The security features set at the global level apply to all categories, attributes, and sub-attributes. The security features set at the category level apply to all corresponding attributes and sub-attributes. The security features set at the attribute level apply to all corresponding sub-attributes and so on. When there is a difference among the settings of the security features, the settings of the security features at the lower level takes precedence over the settings of the security features at the corresponding higher level. For example, if a user sets a value at the global level, and then sets another value at the category level, the value at the category level will determine the setting of the security features. For some embodiments, the user may also have the ability to restrict the duration that the partners can access the user's life state. Following are some examples settings of the security features:

Not available—No information relating to the category, attribute, or sub-attribute is available to any partner or any other parties Available only to preferred/approved list—No information relating to the category, attribute, or sub-attribute is available to any partner or other parties unless they are included in the user's list of approved or preferred partners and/or parties Available—Information relating to the category, attribute, or sub-attribute is available to any partner Available to content providers—No information relating to the category, attribute, or sub-attribute is available to any partner unless the partner is a content provider or the partner is in the list of approved or preferred content providers Available to advertisers—No information relating to the category, attribute, or sub-attribute is available to any partner unless the partner or other party is an advertiser or is in the user's list of approved or preferred advertisers The gatekeeping feature 371 illustrates an option that a user may use to control how much information the user is willing to receive from which partners. The user may use the gatekeeping feature 371 to control how an attribute can be used to filter information from a partner and the volume of the information. The gatekeeping features set at the global level apply to all categories, attributes, and sub-attributes. The gatekeeping features set at the category level apply to all corresponding attributes and sub-attributes. The gatekeeping features set at the attribute level apply to all corresponding sub-attributes and so on. When there is a difference among the settings of the gatekeeping features, the gatekeeping features set at the lower level takes precedence over the gatekeeping features set at the corresponding higher level. For example, if a user sets a gatekeeping value at the global level, and then set another conflicting gatekeeping value at the category level, the gatekeeping value at the category level will prevail. Some examples of the gatekeeping features settings include:

No gatekeeping—All of the information is passed to the user through the funnel

Approved list—The information is passed to the user if the information is from a partner that is in the list of the user's approved or preferred partner Content providers—The information is passed to the user if the information is from a partner who is a content provider or if the partner is in the user's list of approved or preferred content providers Advertisers—The information is passed to the user if the information is from an advertiser or if the information is from a partner who is in the user's list of approved or preferred advertisers.

None—No information is passed to the user

For some embodiments, there may also be many other gatekeeping controls, such as frequency and precedence controls that will affect how the system queues up information from partners—which will be a key control in promoting partners to only push the information that really counts, while the user receives only the information that really counts.

For some embodiments, the settings of the gatekeeping features are subordinate to the settings of the security features. The settings of the security features for any given category or attribute override the settings of the gatekeeping features for the same category or attribute. For example, if the user sets a security feature for a category as "Not available", but the user sets a gatekeeping feature for that category as "No Gatekeeping", then the information delivery server will ignore the setting of the gatekeeping feature. This means that the values of the attributes and sub-attributes associated with that category are not available to any of the partners. The "Not available" security setting may be interpreted as a blocking setting which blocks any information related to a category, attribute, or sub-attribute. In this example, the user will not receive any information related to the "Not available" category even though the gatekeeping feature for that category is set as "No Gatekeeping." The combination of the security features and gatekeeping features allow the users to highly customize how the user grants permission to the user's life state in terms of depth and granularity of information available, types of use, types of partners that can access, etc.

In general, gatekeeping features are different from security in that they determine how information is delivered and displayed to the user. This includes controlling the frequency, extent, type, and volume of filtered information that is pushed by the partner. This is where the marketplace implementation becomes important. When a user wants to allow information for a specific attribute to be sold in the marketplace, but no information is delivered for that attribute, then the security settings would allow visibility in the marketplace, and the gatekeeping settings would not allow information delivery to the portal (or when surfing to external sites).

Automatic Populating and Updating Attribute Values

For some embodiments, the life state application 405 described in FIG. 4 may be configured to auto-populate the attributes and sub-attributes with values. The values may be derived from the partners. It is possible that the partners may accumulate extensive information about a user's behavior, which in turn gives them the ability to populate the users attribute values according to this behavior. For example, a set of attributes for a user's asset inventory may include various products, etc. Amazon.com could easily populate the asset inventory according to the user's purchase history. There may be an option to allow the user to select the auto-populating feature.

Auto-load programs may be created by any approved and active partner. The delineation of which categories/attributes/sub-attributes is updated and how they are updated may be a function of how the Auto-Load program is constructed and how the user runs the program. There may be parameters that will specify whether or not an auto-load program may overwrite values from a previous auto-load by the same partner, or by a previous auto-load by a different partner, or by a previous value input by a user. The quality of these programs and which partner auto-load programs should be used will be functions of the user experience, ratings, and the overall quality and flexibility of the auto-load program.

For some embodiments, the life state application 405 described in FIG. 4 may be configured to automatically update the life state of a user. There may be a setting that enables the user to indicate that the automatic update of the user's life state is allowed. The updates may be based on transactions that the user engages in and may be performed periodically. It is possible that user's behavior may not be consistent with the user's life state. For example, the user indicates in the life state category and attribute values that would lead to avoidance of water sports related transaction behavior. However, when the user visits the websites of the partners, the user frequently purchases items that are for water sports. In this scenario, the life state application 405 may modify the user's life state to align with the user's behavior. This may include automatically translating a user's transactional history into values for the attributes and/or sub-attributes. The user can also review, assess, and override any values that are set from an auto update, if the manual setting of the values better reflects the user's life state. This ensures that the user's life state is up to date.

For some embodiments, the functionality of auto-updating and auto-loading can initially set to baselines, but it can also update attribute values at the users' discretion. There might be options or parameters on the auto-update program such as "Do not update values that have been manually updated." This would mean only null values or those previously set by the auto-update program would be updated.

The automatic update feature also allows the user to assess the situations where their perceived preferences do not correspond to their actual preferences. This may help improve the user rating. The partners also benefit from this feature as well since the updated values will translate into better and more accurate information provided to the users. As a result, the partner may receive a higher rating.

Network with Partner Servers

Figure 5:
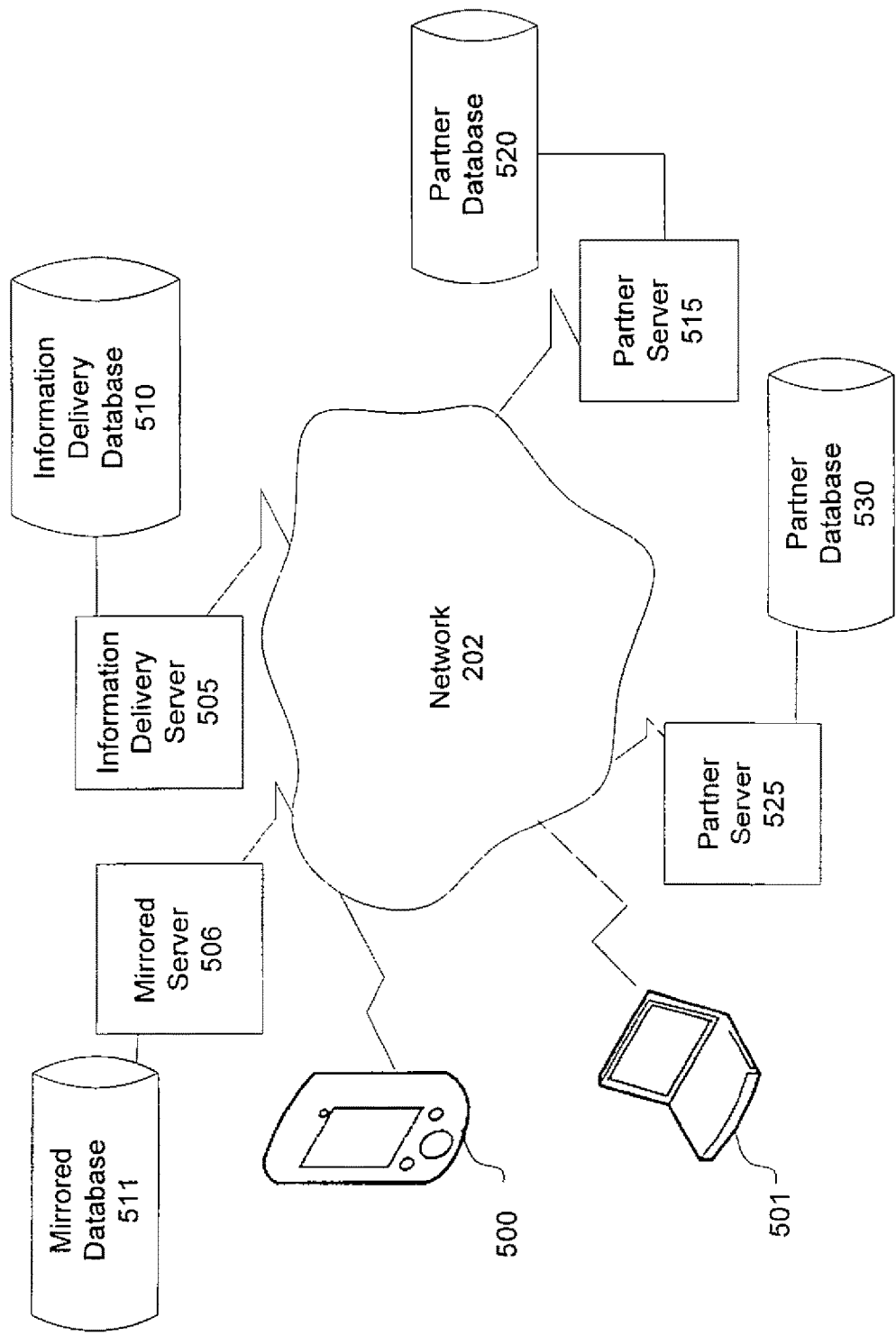
FIG. 5 illustrates an example of a network with an information delivery server, in accordance with some embodiments.

FIG. 5 illustrates an example of a network with an information delivery server, in accordance with some embodiments. The network may include an information delivery server 505 coupled with database 510 and connected to network 202. Also connected to the network 202 are client computing systems 500 and 501, partner servers 515 and 525 and their respective databases 520 and 530. The client computing systems 500, 501 may be configured with browser software to access the services of the information delivery server 505 using the Internet. The client computing systems 500, 501 may be connected to the network 202 via wired or wireless communication (e.g., RF, Bluetooth, etc.). For example, a user may use the client computing system 500 to register with the information delivery server 505, input values to configure the user's life state, and set up security features and gatekeeping features. The user may use the client computing system 500 to log in to the information delivery server 505 and access the user's portal to view the filtered information. The user's life state, security features, gatekeeping features, and filtered information may be stored in the database 510. The network infrastructure described in FIG. 5 may also be used to enable accessing partner websites, performing web searches using partner search engines, and enabling the partners to participate in the marketplace to procure the life states.

Embodiments of the invention may also include mobile-enabled implementations to enable the users to use the mobile devices to communicate with the information delivery server. As illustrated in FIG. 5, the mobile device 500 may be used by a user to connect to the information delivery server 505 via the network 202. Having the mobile capability may enable the users to provide updates on an impulse basis, especially at a time when the user is experiencing something that may need to be reflected in the user's life state. The information delivery server 505 may enable the user to download a mobile application for this purpose. The mobile application may include user interface that makes it easier to provide information about the user's experience. For example, the user may be watching a movie, and the user may use the mobile device to indicate the name of the movie and how much the user enjoys watching that movie. That action will be analyzed by the information delivery server and the user's entertainment attribute may be updated.

Mirroring and Distributed Processing

Referring to FIG. 5, in some embodiments, there may be one or more mirrored servers 506 configured to perform tasks similar to the information delivery servers 505 to accommodate the demand and usage by many users. These mirrored servers may be located at different geographical areas. For example, at a first site, there may be one or more mirrored servers 506. Each of the mirrored servers 506 may be associated with a mirrored database 511 which may be configured to store information similar to the database 510. Further, there may be multiple mirrored sites, each having similar hardware and software configuration and set up as the first site. The multiple sites may collaborate with one another in a distributed manner to help speed up the process enabling the users to set up and maintain their life states, interacting with the partner servers, receiving the filtered information from the partners, enabling the users to configure their portals, presenting the filtered information to the users' portals, etc. Using mirrored servers and distributed processing may help the users to view most relevant and accurate filtered information in their portals in near real time.

It should be noted that there are many different distributed processing architectures and the description provided here is not meant to limit to a particular architecture, but rather to convey that distributed processing may be implemented to provide better user experience for some embodiments.

Flow Diagrams

FIGS. 6-11 describe various processes that may be performed by the information delivery system. Each process includes multiple blocks, with each block representing one or more operations. The sequences of the blocks may vary depending on the implementations. Some operations may be combined while some operations may be separated into multiple operations.

Figure 6:
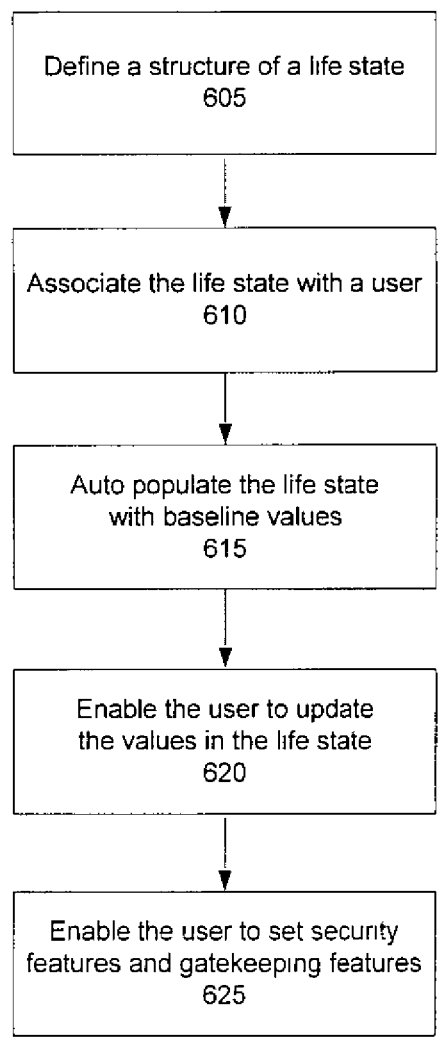
FIG. 6 illustrates an example flow diagram of a process that may be performed by an information delivery system to set up the life states, in accordance with some embodiments.

FIG. 6 illustrates an example flow diagram of a process that may be performed by an information delivery system to set up the life states, in accordance with some embodiments. The process is associated with operations that may be performed by the information delivery server 505 described with FIG. 5. At block 605, the structure of a life state is defined. This may include defining the categories, the attributes, the sub-attributes, and any deeper level of sub-attributes. For example, each of the attributes and sub-attributes may be represented by fields in a database table with each of the fields having a value. Each time a new user is registered with the information delivery server 505, a life state is associated with that user, as shown in block 610. The attributes and the sub-attributes associated with the user's life state may be automatically given some values. These values may be derived from the offerings of the partners, as shown in block 615. At block 620, the user is allowed to update the values of these attributes and/or sub-attributes. This may be due to changes to the user's life. This may be due to the initial values not being aligned with the user's life. At block 625, options may be made available to enable the users to set security features and gatekeeping features. As described, these features allow the users to configure the visibility of the user's life state and how or from whom the information is to be pulled on behalf of the user.

Figure 7:
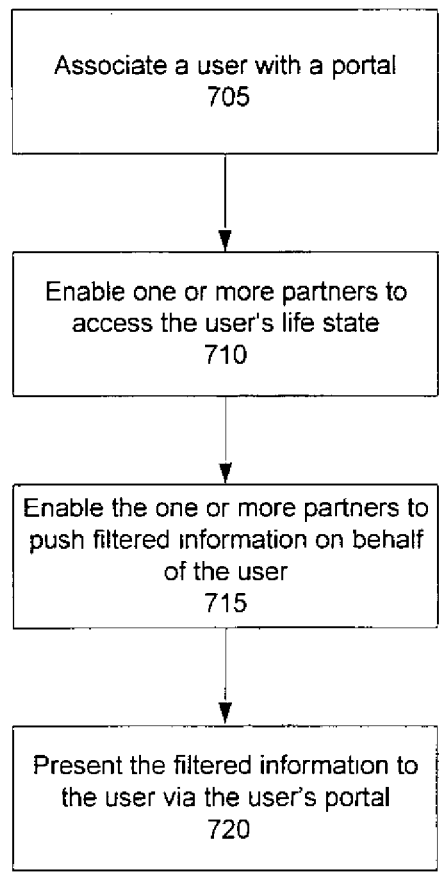
FIG. 7 illustrates an example flow diagram of a process that may be performed by an information delivery system to allow the users to view the filtered information, in accordance with some embodiments.

FIG. 7 illustrates an example flow diagram of a process that may be performed by an information delivery system to allow the users to view the filtered information, in accordance with some embodiments. The process is associated with operations that may be performed by the information delivery server 505 described with FIG. 5. When a user registers with the information delivery system and create a user account, that user account is associated with a user's portal, as shown in block 705. The user may be provided options to configure the user's portal. This may include configuring the layout for the user's portal. At block 710, one or more partners may access the user's life state. The access of the user's life state is based on permissions granted by the users. The partners may use the user's life state to generate filtered information that is aligned with the user's life state. At block 715, the filtered information is pushed by the partners. At block 720, the filtered information is presented to the user via the user's portal.

Figure 8:
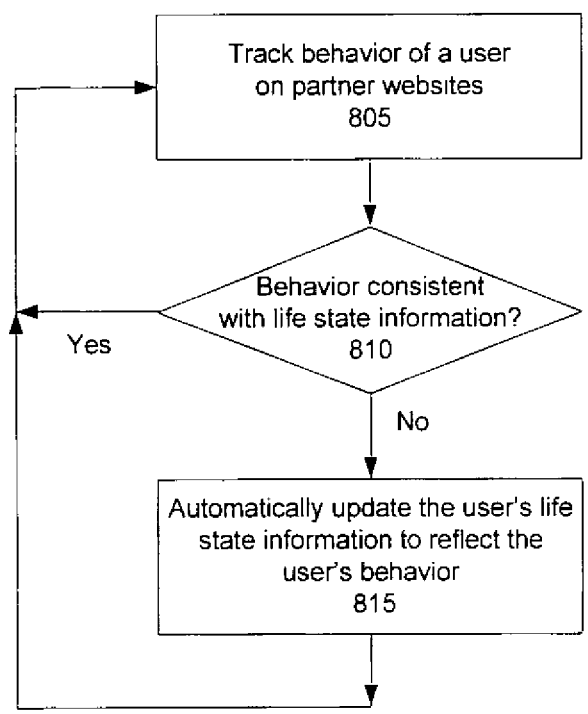
FIG. 8 illustrates an example flow diagram of a process that may be performed on an information delivery server to enable automatically updating the user's life state, in accordance with some embodiments.

FIG. 8 illustrates an example flow diagram of a process that may be performed on an information delivery server to enable automatically updating the user's life state, in accordance with some embodiments. The process is associated with operations that may be performed by the information delivery server 505 described with FIG. 5. The process may include tracking the user's behavior when the user visits a website of a partner. As described above, when the user visits the website of a partner, the partner may recognize that the user is a member of the same information delivery system that the partner is associated with. The partner may customize the content of its website or filter the search results using this information. The account of the user and the account of the partner with the information delivery system may be related or connected. The recognition may be based on the information stored locally on the client computing system of the user. Alternatively, the user id may be locally stored or stored in temporary internet/buffer files by associating with another user login, and then the attribute values from the user's life state may be obtained, refreshed, or updated.

The tracking operation may include interacting with the partner's server and receiving the tracking information from the partner's server, as shown in block 805. At block 810, a test is performed to determine if the user's behavior is aligned with the user's life state. If the user's behavior is aligned, the process flow from block 810 back to block 805 and the determination may continue. However, from the block 810, if the user's behavior is not aligned, the process flow to block 815, where the user's life state may be automatically updated to reflect the user's behavior. From the block 815, the process may flow back to block 805 and the determination may continue. For some embodiments, this process may be performed periodically. An automatic update option may be selected by the user. In this process, the users will also be provided with the attribute values that are not aligned, which may help the user and partner migrate towards better alignment.

Figure 9:
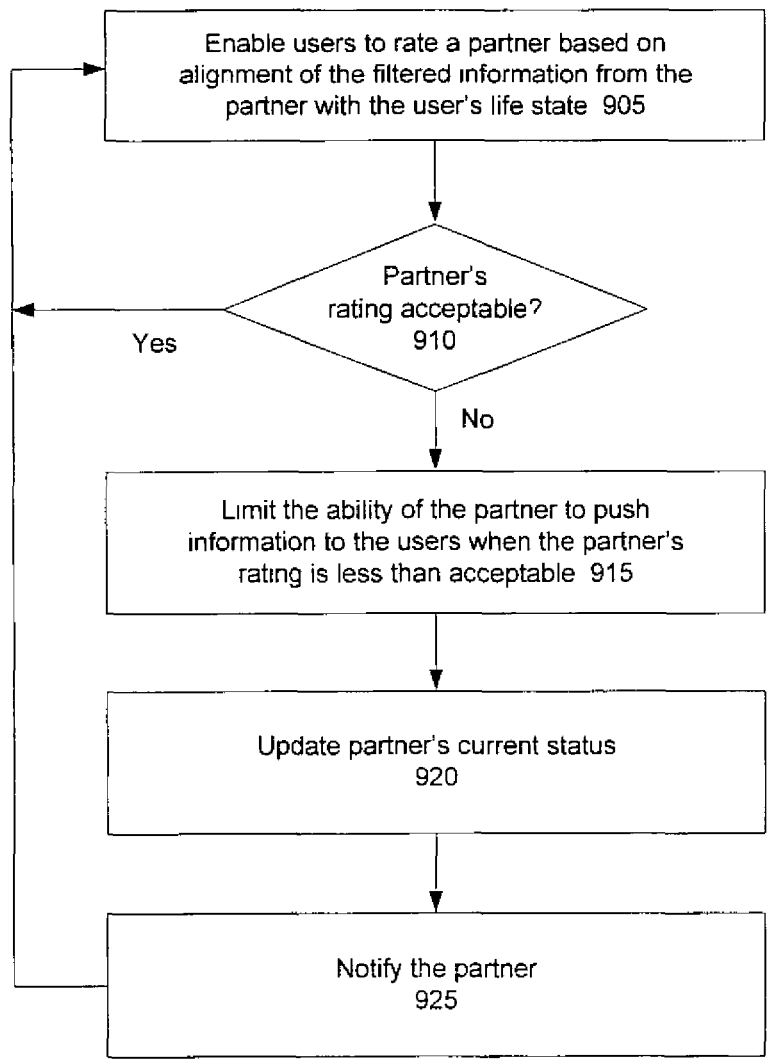
FIG. 9 illustrates an example flow diagram of a process used to rate a partner, in accordance with some embodiments.

FIG. 9 illustrates an example flow diagram of a process used to rate a partner, in accordance with some embodiments. At block 905, the users are enabled to provide rating information for a partner. The rating is based on how the filtered information from the partners is aligned with the users' life states. If the alignment is not as expected, the rating may be low. A rating scale may be set by the management team associated with the information delivery system. At block 910, a test is performed to determine if the rating is acceptable. If the rating is acceptable, the process may flow back to block 905 to collect more ratings. It may be noted that the rating of the partner may be evaluated after collecting a large collection of rating from many users. From the block 910, if it is determined that the rating is not acceptable, the process may flow to block 915 where the information from the partner may be limited. For example, the information pushed by the partner may include unsolicited and/or unwanted advertising information, and the information delivery system may partially or completely block the information from the partner. For some embodiments, if the partner's rating is low, then the user may or may not want to limit the information from that partner. In other words, a low alignment rating for the partner may not necessarily mean the user shows less interest in the information pushed by the partner. If the user wants to further limit, reduce, or prohibit information from a given partner, the user can use the security and gatekeeping settings to do that. At block 920, the information delivery system may change the status of the partner if necessary. For example, the partner may be placed suspended and its status may be changed from "active" to "suspended." This type of disciplinary action may be performed in aggregate. It may be performed by an administrator or someone with such authority, and not likely a function of automation.

At block 925, the partner may be notified about the rating and related changes. For example, warnings may be sent to the partner to notify the partner about the change in status. The partner may fine tune its filtering mechanism to improve alignment. The process may flow from the block 925 to the block 905. The partner rating operations may be performed periodically or as needed.

Figure 10:
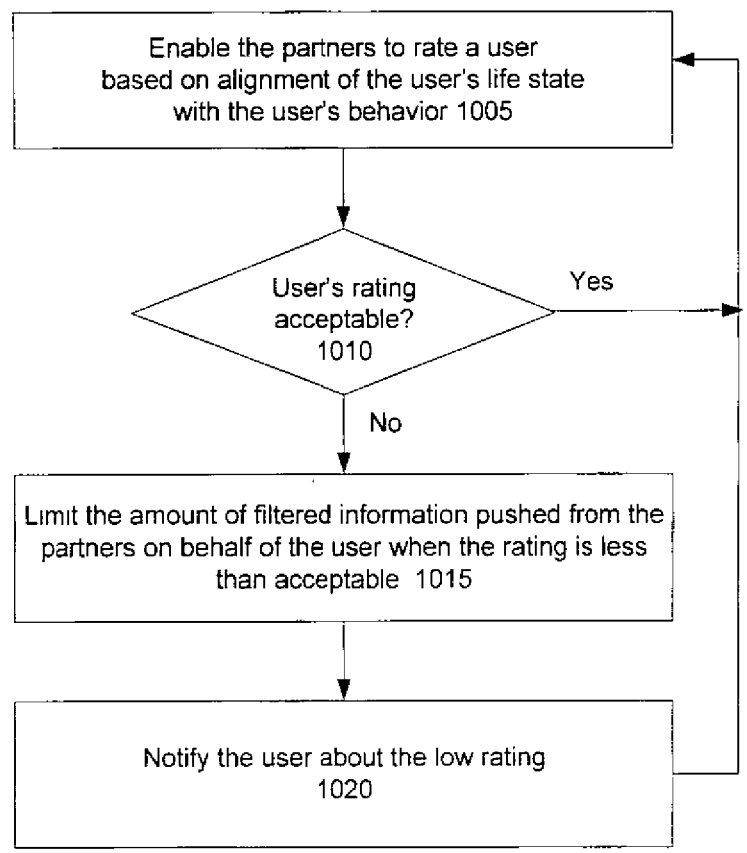
FIG. 10 illustrates an example flow diagram of a process used to rate a user, in accordance with some embodiments.

FIG. 10 illustrates an example flow diagram of a process used to rate a user, in accordance with some embodiments.

At block 1005, the partners are enabled to provide rating information for a user. As described above, a user's life state involves many aspects of the user's life, and it is expected to change as the user experiences changes in the user's life. The changes may be reflected in the user's behavior when, for example, the user visits a website of a partner. The partner may track the user's behaviors, compare those behaviors with the user's life state, and give the user a rating. At block 1010, a test is performed to determine if the rating for the user is acceptable. As with the rating for a partner, a rating scale may be determined by the management team, and the scale may be the same or different from the scale used to rate the partner. If the rating is not acceptable, the process may flow to block 1015, where the information delivery system may perform operations to restrict the amount of filtered information that is pushed on behalf of the user. Other operations may also be performed when the rating is not acceptable. For example, warnings may be sent to the user to notify the user of the low rating; requests may be sent to the user to notify the user to update the user's life state; the status of the user may be changed, etc. as shown in block 1020. From the block 1010, if the rating is acceptable, the process may flow back to block 1005 to collect more ratings. It is possible that the rating of the user may be evaluated after collecting a large collection of rating from many partners. From the block 1020, the process may also flow back to the block 1005. The user rating operations may be performed periodically or as needed. Embodiments of the invention may merely notify the users of the low rating but may not cause any impact on the amount of filtered information being pushed to the user. As such the operations described in block 1015 may not be performed. In these situations, the user may use the user ratings confidentially to manually work on improving the user's life state or maybe just understanding it better.

Figure 11:
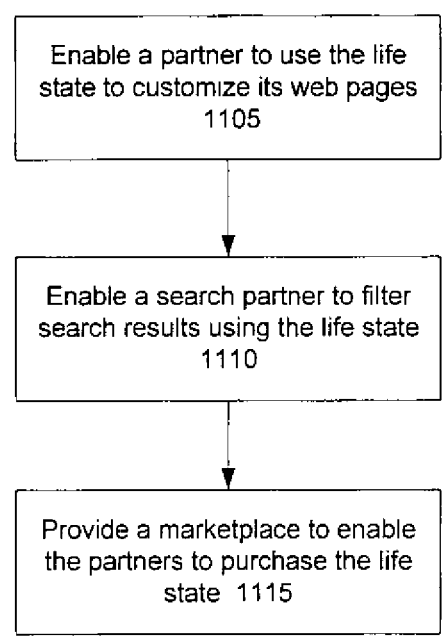
FIG. 11 illustrates an example flow diagram of a process that may be used to enable accessing the user's life state, in accordance with some embodiments.

FIG. 11 illustrates an example flow diagram of a process that may be used to enable accessing the user's life state, in accordance with some embodiments. It may be noted that the operations described in the different blocks of this process may not necessarily need to be performed in sequence and some may be performed by different partners. The blocks are meant to convey different ways that the user's life state may be used by the partners in various situations. In all operations, the information delivery server is configured to enable the partners to access the user's life state.

At block 1105, the user's life state may be used by a partner to customize its website or web pages. This may be useful when the user visits the partner's website. Information not consistent with the user's life state may be filtered from the website and only relevant information may be displayed. The partner may associate the user id of the user with the user's life state from the information delivery system, retrieve (or refresh or update) the user's life state, and customize its web pages accordingly. At block 1110, the user's life state may be used by a search partner to filter its search results when the user visits the site to perform a search. Search results not consistent with the user's life state may be filtered. The search partner may provide a toggle to enable the user to activate or deactivate the filtering of the search results based on the user's life state. At block 1115, the partners may participate in a marketplace (e.g., in the form of an auction) and negotiate to access the user's life state. The access may be based on the user's security and gatekeeping settings and may be in bulk form (e.g., thousands of life states per purchase).

From the descriptions above, embodiments of the inventions may include a method for receiving information about and relevant to a user's life from a user who is a registered member of an information delivery system. The information about and relevant to the user's life includes at least (a) demographic information, (b) ethnic information, (c) social information, and (d) psychological information. The method also includes enabling the user to grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner. In addition, the method includes receiving the filtered information from the partner, wherein the filtered information is generated by the partner based on applying the information about and relevant to the user's life to information of the partner, wherein the information about and relevant to the user's life is provided by the user using a client computing system associated with the information delivery system, and wherein the information about and relevant to the user's life is received by a server computing system associated with the information delivery system. Embodiments of the invention also include a computer-readable media that includes instructions that perform the operations similar to the method described above.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A computer-implemented method for maintaining the integrity of a user's life state information and using permissions to securely control partner access to the life state information, the method comprising:

present, by a plug-in operating on a server of an information delivery system through a web browser operating on a client computing system, one or more fields configured for receiving information pertaining to a life state of a user;

receive, by a server of an information delivery system connected to a network, through a firewall configured between the client computing system and the server, user life state information about and relevant to a user's life from a user who is a registered member of the information delivery system, the user life state information comprising (a) demographic information, (b) ethnic information, (c) social information, and (d)

psychological information, wherein the user life state information is entered through the web browser and is stored in a database accessible over the network;

receive, by the server from the user, permissions granted to a partner associated with a partner server to access the information stored in the database accessible over the network about and relevant to the user's life, wherein the permissions establish both (i) security features and (ii) gatekeeping features with respect to a user's life state information;

registering, by the server, a partner associated with a partner server with the information delivery system;

controlling, by the server in accordance with the security features, access of the registered partner associated with the partner server to the user's life state information stored in the database;

receive, by the server, filtered information from the partner associated with the partner server, wherein the filtered information is generated by the partner based on applying the information about and relevant to the user's life;

controlling, by the server, frequency, extent, type, and volume of filtered information that is pushed by the partner to the client device in accordance with the gatekeeping features;

establish, by the server, a data structure including attribute fields related to one another, wherein each of the attribute fields is associated with a value, and wherein the data structure includes multiple levels such that an attribute field at a lower level provides more detail information and value than a corresponding field at a higher level;

automatically populate, by the server, the fields of the data structure with a set of baseline values; and updating, by the user through the client system, the baseline values and non-baseline values to accurately reflect the user's life.

2. A system for maintaining the integrity of a user's life state information and using permissions to securely control partner access to the life state information, the system comprising:

a database accessible over the network;

a firewall; and, a server of an information delivery system, the server configure to:

host a plug-in, the plug-in configured to present, through a web browser of a client computing system, one or more fields configured for receiving information pertaining to a life state of a user;

receive, through the firewall, user life state information about and relevant to a user's life from a user who is a registered member of the information delivery system, the user life state information comprising (a) demographic information, (b) ethnic information, (c) social information, and (d) psychological information, wherein the user life state information is received through the web browser and the firewall is arranged between the client computing system and the server;

store, in the database accessible over the network, the received life state information;

receive permissions granted to a partner associated with a partner server to access the information stored in the database accessible over the network about and relevant to the user's life, wherein the permissions establish both (i) security features and (ii) gatekeeping features with respect to a user's life state information;

register a partner associated with a partner server with the information delivery system;

control, in accordance with the security features, access of the registered partner associated with the partner server to the user's life state information stored in the database;

receive filtered information from the partner associated with the partner server, wherein the filtered information is generated by the partner based on applying the information about and relevant to the user's life;

control frequency, extent, type, and volume of filtered information that is pushed by the partner to the client device in accordance with the gatekeeping features;

establish a data structure including attribute fields related to one another, wherein each of the attribute fields is associated with a value, and wherein the data structure includes multiple levels such that an attribute field at a lower level provides more detail information and value than a corresponding field at a higher level;

automatically populate the fields of the data structure with a set of baseline values; and receive, from a user through the client system, update data for the baseline values and non-baseline values to accurately reflect the user's life.

* * * * *